(12) United States Patent
Compton

(10) Patent No.: US 6,183,541 B1
(45) Date of Patent: Feb. 6, 2001

(54) BAFFLED HORIZONTAL DEHYDRATOR

(76) Inventor: Bill E. Compton, 1315 S. Indian, Tulsa, OK (US) 74127

( * ) Notice: Under 35 U.S.C. 154(b), the term of this patent shall be extended for 0 days.

(21) Appl. No.: 09/383,747

(22) Filed: Aug. 26, 1999

(51) Int. Cl.[7] .................................................. B01D 53/14
(52) U.S. Cl. .............................. 95/221; 95/226; 95/231; 96/278; 96/295; 96/326; 96/346; 96/350
(58) Field of Search .................... 95/216, 210, 226, 95/221, 222, 231; 96/234, 262, 269, 278, 290, 295, 299, 274, 325, 326, 346, 350, 348

(56) References Cited

U.S. PATENT DOCUMENTS

| | | | |
|---|---|---|---|
| 177,580 | * | 5/1876 | Solvay ..................................... 95/226 |
| 2,612,745 | * | 10/1952 | Vecchio .................................. 96/350 |
| 2,924,295 | * | 2/1960 | Reeves ................................... 95/226 |
| 3,353,336 | * | 11/1967 | Caballero ............................... 96/350 |
| 3,691,732 | * | 9/1972 | Richards et al. ........................ 96/262 |
| 3,815,332 | * | 6/1974 | Bobrowsky et al. ................... 96/262 |
| 4,676,811 | * | 6/1987 | Wade ..................................... 96/262 |
| 5,713,970 | * | 2/1998 | Raring ................................... 96/297 |

* cited by examiner

*Primary Examiner*—Duane S. Smith
(74) *Attorney, Agent, or Firm*—Frank J. Catalano

(57) ABSTRACT

A natural gas dehydrator and process for dehydrating natural gas employ a longitudinal horizontal pressure vessel containing a threshold level of liquid desiccant. A plurality of spaced-apart baffles divides the vessel into a series of pneumatically discrete compartments. The baffles have a plurality of apertures which define a sinusoidal gas flow path through the vessel into and out of the liquid desiccant from the inlet to the outlet. Each of the baffles also has an opening in its lowermost portion which define a linear primary liquid desiccant flow path through the vessel from the inlet to the outlet. The baffled vessel is fixed within another longitudinally horizontal pressure vessel so as to define a chamber therebetween. Dried gas and wet desiccant are discharged from the inner or baffled vessel into the chamber where they are gravity separated, the dried gas flowing to an outlet on top of the outer vessel and the wet desiccant flowing to a sump at the bottom of the outer vessel.

20 Claims, 3 Drawing Sheets

BAFFLED HORIZONTAL DEHYDRATOR

BACKGROUND OF THE INVENTION

This invention relates generally to equipment used to purify natural gas and more particularly concerns dehydrators for removing water from natural gas.

Natural gas is presently dried by use of trayed towers, perhaps 1.5 to 9 feet in diameter and 20 or more feet tall. The gas is passed from a spreader at the bottom of the tower to a small outlet at the top of the tower while liquid desiccant, such as triethylene glycol spurted into the top of the tower against approximately 1,000 psi flows to bottom of the tower as each tray overflows to the next in zig-zag fashion. Each tray interposes an approximately one inch thick lamina of desiccant in the path of the gas. Since there are typically 5 to 9 trays in a tower, every gas molecule is expected to pass through 5 to 9 inches of desiccant. The wet desiccant at the bottom of the tower is then heated to boil off the water and the pure desiccant is pumped to the top of the tower. For example, if triethylene glycol is used, the wet glycol is heated to approximately 375° F. to boil off the water.

There are serious disadvantages in using the trayed tower equipment. A first disadvantage is that the diameter of the dried gas outlet at the top of the tower, typically is ⅙ the diameter of the trays. Since the gas tries to flow along the most direct path to the outlet, the gas flow pattern is generally conical. Thus, while the trays and, therefor, the glycol laminae are of equal diameter, the unused area of each sequentially higher lamina concentrically increases until, at the top of the tower, very little of the glycol is put to use. A second disadvantage related to the first is that, as tower diameter is increased, the inefficiency of the unit is also increased because the unused area is a function of the square of the diameter. Thus, while an 18" diameter tower might require 3 gallons of glycol to absorb 1 pound of water, a 9' diameter tower might require 4 gallons of glycol to absorb 1 pound of water. This leads us to a third disadvantage which is that, even for small diameter towers, more glycol must be heated in the boil-off process than was effectively used in the drying process and, for larger diameter towers, energy is wasted at an increasing rate. A fourth disadvantage is that the trayed tower system blows an initial gas molecule through a small hole in the bubble cap associated with the tray. Subsequent gas molecules tend to follow the path cleared by the initial molecule and, therefor, may not be fully contacted by the desiccant. A fifth disadvantage is that, since the tower configuration provides 5 to 9 one inch laminae of desiccant, the residence time of the gas in the desiccant is quite limited, further reducing the efficiency of the equipment. A sixth disadvantage of trayed tower dehydrators is that, although the gas is relatively volatile, the gas flow pattern is so linear that there is too little interaction of the molecules to promote useful contact with desiccant between laminae. A seventh disadvantage of trayed tower dehydrators is that they cannot be used in floating production system operation or FPSO such as a tanker retrofitted with production equipment on the deck. The angle and alignment of the trays must be maintained to assure the uniform flow of desiccant across each tray and overflow between trays. The natural motion of a ship or tanker floating on a body of water prohibits this necessary uniform flow and overflow. Most of the future offshore drilling and production will be in water one to two miles or more deep. This is impossible with fixed leg platforms and, therefore, all such drilling and production will be done using FPSO systems.

It is, therefor, an object of this invention to provide a dehydrator for and method of dehydrating natural gas in which the flow path of the gas is sinusoidal along a horizontal axis into and out of the liquid desiccant. Another object of this invention is to provide a dehydrator for and method of dehydrating natural gas in which the flow path of the gas is sinusoidal between zeniths and nadirs radially distant from the longitudinal axis of the dehydrator. Yet another object of this invention is to provide a dehydrator for and method of dehydrating natural gas which uses the liquid desiccant available for the drying process and the energy required in the boil-off process more efficiently than in presently known dehydrators. Still another object of this invention is to provide a dehydrator for and method of dehydrating natural gas in which a greater percentage of the gas molecules come in full contact with the liquid desiccant while they are in the desiccant pool than in presently known dehydrators. A further object of this invention is to provide a dehydrator for and a method of dehydrating natural gas which afford greater residence time of the gas in the liquid desiccant than presently known dehydrators. Another object of this invention is to provide a dehydrator for and method of dehydrating natural gas which take advantage of the volatile nature of the gas to cause the gas to come into useful contact with liquid desiccant even when the gas is not in the desiccant pool. It is also an object of this invention to provide a dehydrator for and method of dehydrating natural gas which is useful in floater applications.

SUMMARY OF THE INVENTION

In accordance with the invention, a natural gas dehydrator and process for dehydrating natural gas are provided in which a longitudinally horizontal pressure vessel containing a threshold level of liquid desiccant has an inlet for admitting gas at one end and an outlet for discharging gas at an opposite end. A plurality of spaced-apart baffles divides the vessel into a series of pneumatically discrete compartments. Each of the baffles has a plurality of apertures therethrough, the apertures of alternate baffles being disposed in lower and upper portions thereof so as to define a sinusoidal gas flow path into and out of the liquid desiccant from the inlet to the outlet. Each of the baffles also has an opening in the lowermost portion thereof so as to define a linear primary liquid desiccant flow path from the inlet to the outlet. The baffled vessel is fixed within another longitudinally horizontal pressure vessel so as to define a chamber therebetween. Dried gas and wet desiccant are discharged through the inner or baffled vessel outlet into the chamber where they are gravity separated, the dried gas flowing to an outlet on top of the outer vessel and the wet desiccant flowing to a sump at the bottom of the outer vessel.

Preferably, the vessels are concentrically cylindrical and the baffles are substantially circular with the apertures disposed in the upper and lower 40% of the surface area of alternate baffles. The threshold level establishes a pool for liquid desiccant which covers the lower 60% of the surface area of all the baffles. The apertures of each baffle are spaced so as to promote the homogeneous dispersal of the gas in the liquid desiccant.

Preferably, an inlet pipe extending from the inner vessel inlet through an end wall of the outer vessel is turned upwardly to prevent backflow of liquid desiccant toward the natural gas sources. An outlet pipe extending from the inner vessel outlet turns upwardly into the chamber between the vessels to set the threshold level of liquid desiccant. The outlet pipe has a tee configuration so as to discharge laterally in two directions. An annular baffle proximate the inner vessel outlet divides the chamber. The annular baffle has perforations for removing wet desiccant from the dried gas molecules as the gas flows therethrough and has an open lower portion for passing wet liquid desiccant therethrough. Also preferably, a level control, valve and sight glass are provided to facilitate maintenance and observation of the desiccant level in the sump. A mist extractor disposed in the chamber filters the dried gas before discharge through the outer vessel gas outlet.

According to the process for dehydrating natural gas, liquid desiccant is pumped at the predetermined threshold level along a substantially linear path through the longitudinally horizontal inner pressure vessel. Gas from a pressurized source is fed through the inner pressure vessel along a sinusoidal path defined by the baffles with zeniths above the threshold level and nadirs below the threshold level to produce an output of dried gas and wet desiccant. The output of dried gas and wet desiccant is received in the outer longitudinally horizontal pressure vessel where the wet desiccant and dried gas are gravity separated. The dried gas is fed through the perforated baffle in the chamber to assure that the wet desiccant has been substantially completely removed from the dried gas. The wet desiccant is pressure fed to a purification system for return to the inner vessel inlet.

BRIEF DESCRIPTION OF THE DRAWINGS

Other objects and advantages of the invention will become apparent upon reading the following detailed description and upon reference to the drawings in which.

DETAILED DESCRIPTION

Figure 1:
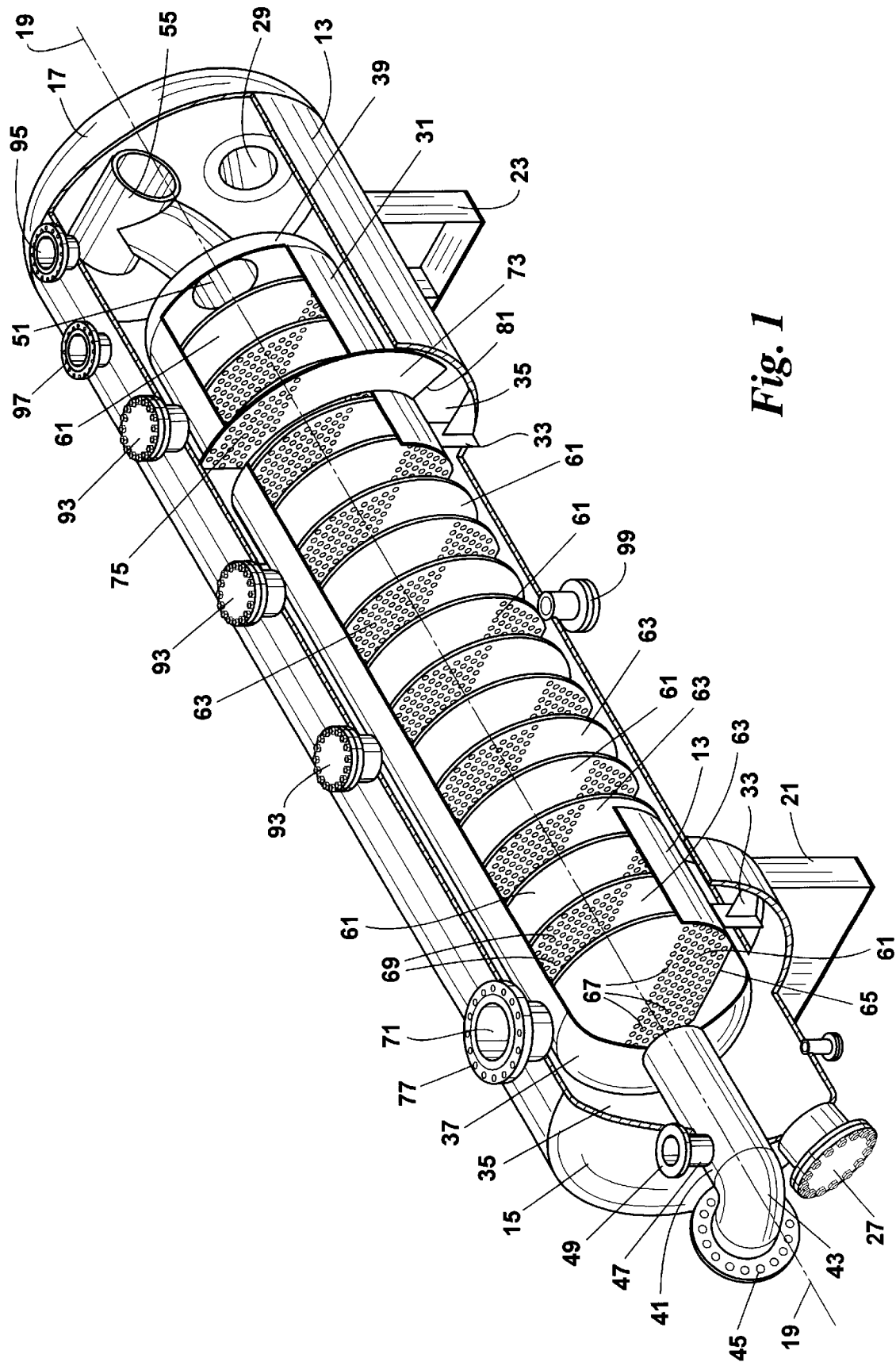
FIG. 1 is a perspective view with parts broken away of a preferred embodiment of the natural gas dehydrator.
Figure 2:
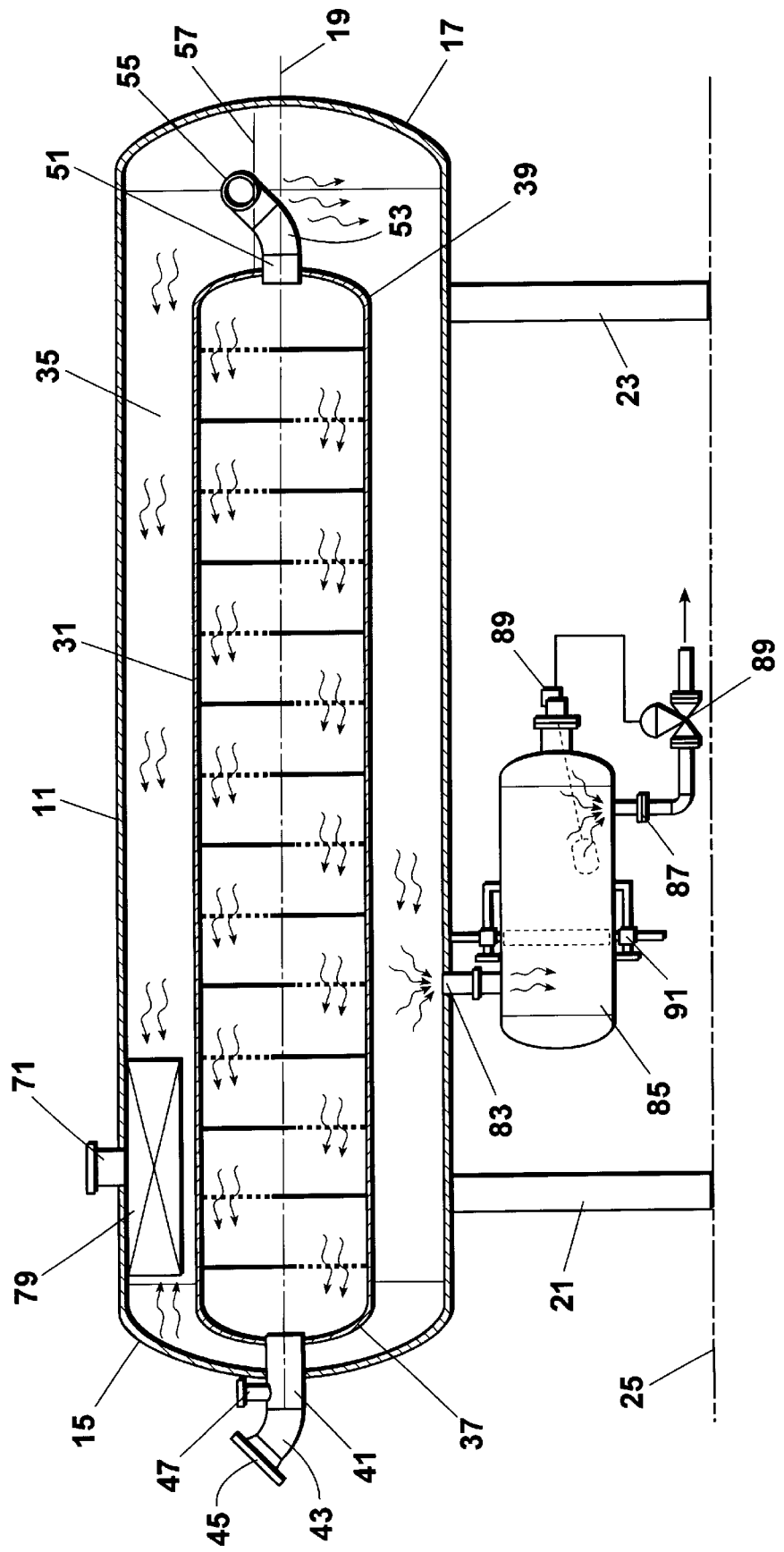
FIG. 2 is a diagrammatic cross-sectional view along a diametric vertical plane of a preferred embodiment of the natural gas dehydrator.

Turning first to FIGS. 1 and 2, in a preferred embodiment of the natural gas dehydrator, an outer pressure vessel 11 has a cylindrical body 13 with inlet and outlet end covers 15 and 17, respectively. The outer vessel 11 is preferably made of carbon or stainless steel, depending on the corrosiveness of the gas to be dried. Typically, the vessel 11 is constructed to handle pressures in a range of 1000 psi or considerably greater, depending on the application. The outer vessel 11 is supported on a longitudinally horizontal axis 19 by supporting frames 21 and 23. The support frames 21 and 23 hold the outer vessel 11 sufficiently above grade 25 to allow external equipment to be attached to the bottom of the outer pressure vessel 11, as is hereinafter explained. For convenience in maintaining the dehydrator, man ways 27 and 29 may be provided in the lower portion of the outer vessel covers 15 and 17.

An inner pressure vessel 31, which is also cylindrical, is concentrically fixed on the axis 19 within the outer pressure vessel 11 by a plurality of saddles 33 spaced along the length of the vessels 11 and 31 so as to define a chamber 35 between the vessels 11 and 31. The inner vessel 31, which is also preferably carbon or stainless steel, has inlet and outlet end covers 37 and 39, respectively.

An inlet pipe 41 extends from the inlet end cover 37 of the inner pressure vessel 31 through the inlet end cover 15 of the outer pressure vessel 11 to an upwardly turned elbow 43 which extends to a flange 45. Preferably, the elbow 43 is a 45° elbow which will be mated at installation by use of the flange 45 to a pipe extending from the natural gas source through a downwardly turned 45° elbow, thus providing 90° upward path from the inner pressure vessel 31 toward the natural gas source. The inlet pipe 41 also has a top inlet 47 extending upwardly to a collar 49. The upwardly extending inlet 47 is connected on installation to a source of liquid desiccant by use of the collar 49. Preferably, the inlet pipe 41 is concentrically aligned on the axis 19 and the combined 90° turn of the two 45° elbows prevents back flow of liquid desiccant from the desiccant inlet 47 or from the inner pressure vessel 11 toward the natural gas source.

An outlet pipe 51 extends from the outlet end cover 39 of the inner pressure vessel 31 to an upwardly turned 45° elbow 53 which extends to a tee 55. Preferably, the outlet pipe 53 is concentric about the horizontal axis 19 and the elbow 53 extends upwardly so that the lower inside surface of the lateral portion of the tee 55 is at the desired threshold level 57 of liquid desiccant. This threshold level 57 is preferably selected so that the lower 60 to 65% of the interior cross section of the inner vessel 31 is covered by liquid desiccant. The tee 55 disperses the output from the inner vessel 31 in two lateral directions into the chamber 35 between the outer and inner vessels 11 and 31.

Figure 3B:
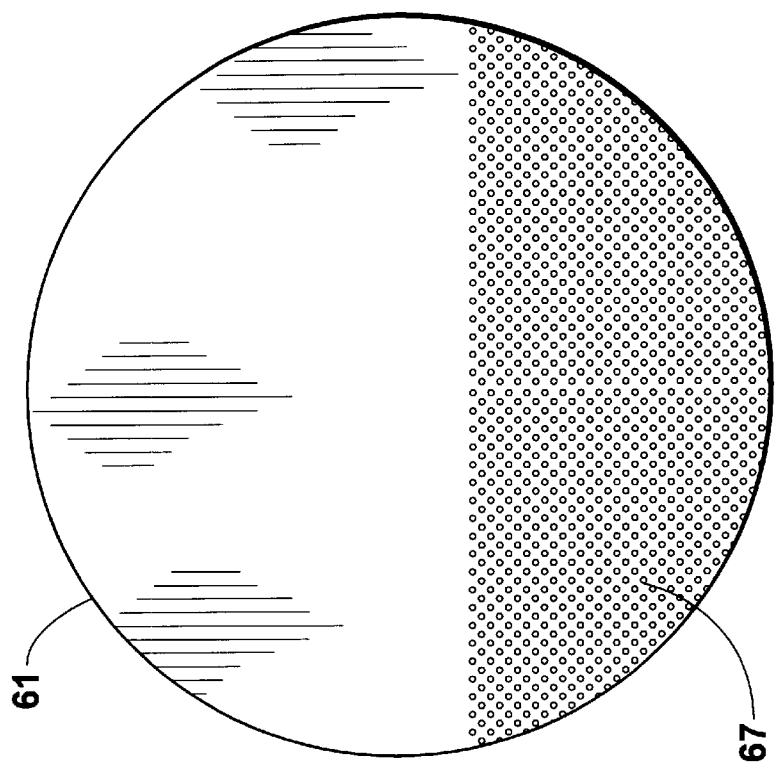
FIGS. 3A and B are elevational views of an embodiment of baffles for use in the dehydrator of FIGS. 1 and 2.
Figure 3A:
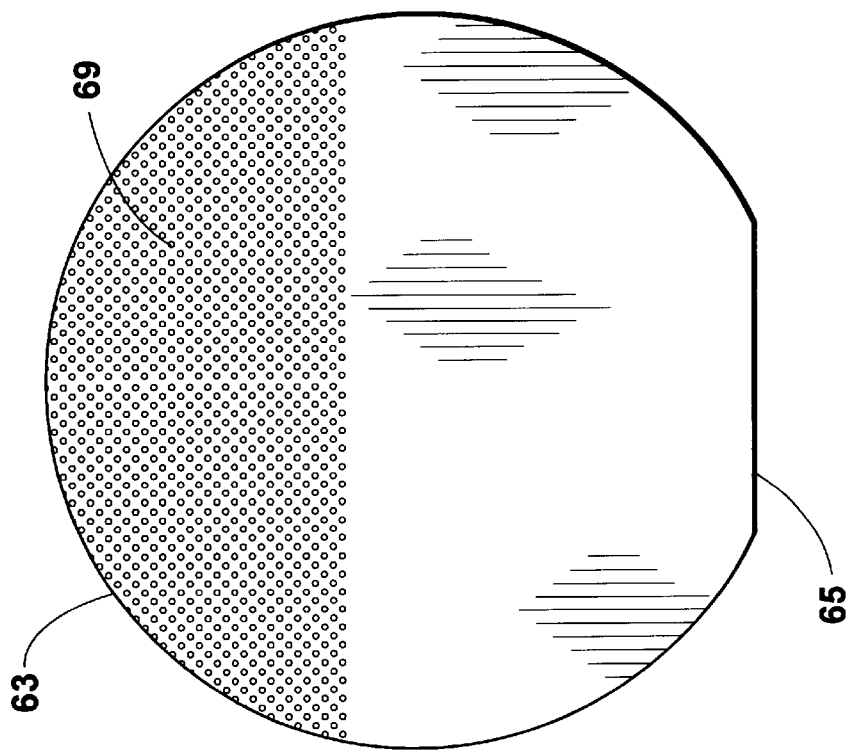

The inner chamber is divided into a plurality of pneumatically discrete compartments by baffles 61 and 63. The baffles 61 and 63 are all preferably circular carbon or stainless steel plates welded to the interior wall of the inner vessel 31. In a prototype dehydrator approximately thirty feet in length and eight feet in outer diameter, the baffles 61 and 63 are spaced on approximately sixteen inch centers. As shown, seventeen baffles 61 and 63 are employed, but this number may vary considerably depending on the application. All of the baffles 61 and 63 have a cutaway portion or opening 65 at their lowermost edge. In the prototype dehydrator sized above, the cutout or opening 65 is a two to three inch cord at the bottom of the baffle 61 or 63. When liquid desiccant is introduced into the inner vessel 31 through the inlet end cover 37, the openings 65 allow the desiccant to flood all of the compartments in the vessel 31 up to the threshold level 57. When the desiccant has risen to the threshold level 57, it pours out of the tee 55 into the outer vessel 11. The baffles 61 and 63 are alternated from the input to the output end of the inner vessel 31. Moving from left to right in the drawing, the odd baffles 61 have a plurality of apertures 67 disposed in their lower portion. The apertures 67 are dispersed below the threshold desiccant level 57. Most preferably, the apertures 67 will also be in the lower 40% of the area of the baffles 61 and above the cut out 65. Conversely, the even baffles 63 have a plurality of apertures 69 dispersed above the threshold desiccant level 57 and preferably in the upper 40% of the area of the baffles 63. Thus, when the inner vessel 31 is filled with liquid desiccant to the threshold level and natural gas is introduced through the inner vessel inlet end cover 37, the gas must flow down and up through apertures 67 and 69 into and out of the liquid desiccant, resulting in a substantially sinusoidal primary gas flow path through the inner vessel 31. While some gas may flow through the openings 65 at the bottoms of the baffles 61 and 63, the gas flowing in this path is relatively insignificant and furthermore has greatly extended residence time in the desiccant. However, since all of the apertures 67 and openings 65 through the odd baffles 61 are below the threshold desiccant level 57, it is impossible for gas to travel through the inner vessel 31 without considerable residence time in the desiccant. The baffles 61 and 63 may be made without and with the cutouts 65, respectively, as shown in FIGS. 3A and 3B, in which case the primary desiccant path will alternate through the cutouts 65 and the apertures 67.

The term sinusoidal as used herein is indicative not of absolutely sinusoidal motion but is representative of an up and down pattern along the length of the inner vessel 31 in contrast to the substantially linear pattern of gas flow in conventional dehydrators. The apertures 67 and 69 should also be dispersed in the baffles 61 and 63 so as to reasonably promote an homogeneous dispersal of gas in the liquid desiccant but this also is relative to conventional dehydrators. It is believed that the more homogeneously the apertures are disposed, the more efficiently the liquid desiccant will be used. However, perfect homogeneous dispersal is not required for the successful operation of the dehydrator.

It is possible that, upon exiting the tee outlet 55 from the inner vessel 31, some of the gas molecules may still be in contact with the liquid desiccant. Therefore, the gas outlet 71 from the outer vessel 11 is positioned proximate the inlet end 37 of the inner vessel 31 and an annular baffle 73 is positioned in the chamber 35 between the gas outlet 71 and the inner vessel tee outlet 55. The baffle 73 divides the chamber 35 and is perforated in its upper portion so that the gas molecules injected into the chamber 35 from the inner vessel outlet tee 55 must pass through the perforations 75 on the way to the outlet 71. This strips any of the remaining desiccant from the gas molecules before they reach the gas outlet 71. A flange 77 on the gas outlet 71 permits the gas outlet 71 to be connected to the gas sales line (not shown). As can best be seen in FIG. 2, it may also be desirable to mount a mist extractor 79 in the gas flow path to the outer vessel outlet 71 as a final assurance of the removal of any liquid distillate or desiccant from the gas stream.

The chamber baffle 73 also has an opening 81 or cutout at its lower portion so as to permit the wet desiccant, which is gravity fed from the inner vessel tee 55 into the chamber 35, to flow toward the inlet end 37 of the inner pressure vessel 31. As can best be seen in FIG. 2, the wet desiccant flows through a desiccant outlet 83 into a sump 85 extending below the outer vessel 11. The sump 85 has a wet desiccant outlet 87 with a level control or throttle valve 89 set to maintain the sump 85 at a predetermined level. It is preferred that the level of wet desiccant in the sump 85 be maintained at the elevational midpoint of the sump 85. To this end, a site glass 91 is provided to permit observation and monitoring of the sump desiccant level.

In the prototype or test dehydrator, test ports 93 will be positioned so as to access the sinusoidal gas flow path at intermittent points along the inner vessel 31 so as to monitor the dehydration process and determine the minimum number of baffles 61 and 63 necessary in the dehydration process. Also, a pressure gauge port 95 will be provided to permit monitoring of the pressure in the chamber 35. Another port 97 facilitates connection of relief valves and rupture disks to protect the pressure vessels 11 and 31. Finally, a drain 99 provides access to determine the water content of the desiccant at approximately the midpoint of the inner vessel 31.

In the operation of the device, the desiccant inlet 47 and the gas inlet 41 are connected to their respective sources. Desiccant is pumped into the inner pressure vessel 31 through the openings 65 at the bottom of the baffles 61 and 63 along a substantially linear primary desiccant path until the liquid desiccant reaches the predetermined threshold level 57. At this point, the desiccant flows from the outlet tee 55 and disperses into the chamber 55. The liquid desiccant flows through the opening 81 at the bottom of the chamber baffle 73 and flows to and begins to fill the sump 85. When the sump 85 is filled with desiccant to the predetermined level set on the level controller 89, the controller releases desiccant as necessary through the wet desiccant outlet 87 to maintain the desired level. When the desired level is observed by use of the site glass 91 or other monitoring mechanism, a valve in the natural gas line is opened to introduce gas, usually at a pressure in the range of 750 to 1000 psi, into the inner vessel 31. The inner vessel 31 will momentarily absorb the pressure increase but, since that pressure quickly is applied into the chamber 35 surrounding the inner vessel 31, the overall pressure on the inner vessel 31 is rather quickly equalized to an approximately 15 pound difference. This difference is sufficient to induce the gas flow through the sinusoidal pattern of apertures 67 and 69 in the baffles 61 and 63. Thus, the primary flow of gas will be through the apertures 67 and 69 while the primary flow of desiccant will be through the openings 65 at the bottom of all of the baffles 61 and 63. Some of the gas will flow through the openings 65 at the bottom of all of the baffles 61 and 63 but gas cannot pass through the odd baffles 61 without passing through the desiccant. Thus, an up and down or sinusoidal path of gas flow is established in which the gas molecules are resident in the desiccant for at least half the distance from the inlet end 37 to the outlet end 39 of the inner vessel 31. In addition, since the gas molecules rise upwardly out of the desiccant and then are required to change direction at the next baffle 63, the volatile surge of gas upwardly into the space above the desiccant and the subsequent change in direction results in a turbulent bombardment of the gas molecules with the desiccant that is carried with them. This further increases the contact time of the gas molecules with the desiccant. The sinusoidal feeding of the gas between zeniths above and nadirs below the threshold level 57 produces an output of dried gas and wet desiccant into the chamber 35. The wet desiccant and dry gas are there gravity separated with the dried gas feeding through the perforated baffle 73 to assure that the wet desiccant has been substantially all removed from the dried gas. From the perforated baffle 73, the gas is further purified in the mist extractor 79 before being released through the outer vessel outlet 71 to the gas sales line. The wet desiccant is fed through the control valve 89 and the sump outlet 87 to a purification system, typically consisting of heat exchangers and reboilers (not shown), for return to the desiccant inlet 47.

The dimensions above referenced are given in relation to the prototype to be tested. Many fewer baffles than have been shown may be required. On the other hand, for some applications, more baffles than shown may be required. The overall dimensions, baffle spacing, aperture size and dispersal, threshold level and baffle glycol openings may vary considerably depending on a given application. The preferred liquid desiccant is triethylene glycol, but other desiccants may be used. Furthermore, the baffles 61 and 63 may be alternated in varying multiples rather than on an odd and even basis and the first and last baffles may be apertured in their upper rather than their lower portions, though it is preferred that they be apertured in their lower portions so as to maximize the residence time of the gas in the desiccant and also to utilize the upward violence of the gas molecules as they exit the outlet tee 55 to separate the wet desiccant from the gas molecules.

Thus, it is apparent that there has been provided, in accordance with the invention, a natural gas dehydrator for and method of dehydrating natural gas that fully satisfy the objects, aims and advantages set forth above. While the invention has been described in conjunction with a specific embodiment and method, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A gas dehydrator comprising:
   a longitudinally horizontal pressure vessel for containing a threshold level of liquid desiccant therein and having an inlet for admitting gas and an outlet for discharging gas at opposite ends thereof; and
   a plurality of spaced-apart baffles dividing said vessel into a series of pneumatically discrete compartments, said baffles having a plurality of apertures therethrough, said apertures defining a sinusoidal gas flow path into and out of the liquid desiccant from said inlet to said outlet.

2. A gas dehydrator comprising:
   a longitudinally horizontal pressure vessel for containing a threshold level of liquid desiccant therein and having an inlet for admitting gas and desiccant and an outlet for discharging dried gas and wet liquid desiccant at opposite ends thereof; and
   a plurality of spaced-apart baffles dividing said vessel into a series of pneumatically discrete compartments, each of said baffles having a plurality of apertures therethrough, said apertures of alternate baffles being disposed in lower and upper portions thereof so as to define a sinusoidal primary gas flow path into and out of the liquid desiccant from said inlet to said outlet, and each of said baffles having an opening in a lowermost portion thereof so as to define a linear primary liquid desiccant flow path from said inlet to said outlet.

3. A gas dehydrator comprising:
   a first longitudinally horizontal pressure vessel;
   a second longitudinally horizontal pressure vessel fixed within said first vessel, said vessels being cooperable to define a chamber therebetween, said second vessel for containing a threshold level of liquid desiccant therein, said second vessel having an inlet at one end thereof for admitting gas and pure liquid desiccant from an outside source into said second vessel and an outlet at an opposite end thereof for discharging dried gas and wet liquid desiccant from said second vessel into said chamber; and
   a plurality of spaced-apart baffles dividing said second vessel into a series of pneumatically discrete compartments, each of said baffles having a plurality of apertures therethrough, said apertures of alternate baffles being disposed in lower and upper portions thereof so as to define a sinusoidal primary gas flow path into and out of the liquid desiccant from said inlet to said outlet, and each of said baffles having an opening in a lowermost portion thereof so as to define a linear primary liquid desiccant flow path from said inlet to said outlet.

4. A gas dehydrator according to claim 3, said vessels being concentrically cylindrical and said baffles being substantially circular.

5. A gas dehydrator according to claim 3, said apertures being disposed in an upper and lower 40% of a surface area of said alternate baffles.

6. A gas dehydrator according to claim 5, said threshold level defining a pool for liquid desiccant covering a lower 60% of a surface area of all said baffles.

7. A gas dehydrator according to claim 3, said apertures of each said baffle being spaced therein so as to promote an homogeneous dispersal of the gas in the liquid desiccant.

8. A gas dehydrator according to claim 3 further comprising an inlet pipe extending from said second vessel inlet through an end wall of said first vessel and turning upwardly therefrom to prevent backflow of liquid desiccant therein.

9. A gas dehydrator according to claim 3 further comprising an outlet pipe extending from said second vessel outlet and turning upwardly therefrom into said chamber to set said threshold level of liquid desiccant.

10. A gas dehydrator according to claim 9, said outlet pipe having a tee configuration so as to discharge laterally in two directions.

11. A gas dehydrator according to claim 3 further comprising a sump mounted on a bottom of said first vessel proximate an end thereof opposite said second vessel outlet for receiving liquid desiccant from said first vessel.

12. A gas dehydrator according to claim 11, said sump having a level controller.

13. A gas dehydrator according to claim 12, said sump having a sight glass facilitating observation of a desiccant level in said sump.

14. A gas dehydrator according to claim 3 further comprising an outlet on a top of said first vessel proximate an end thereof opposite said second vessel outlet for discharging dried gas from said first vessel.

15. A gas dehydrator according to claim 14 further comprising a mist extractor disposed in said chamber for filtering the dried gas before discharge thereof through said first vessel gas outlet.

16. A gas dehydrator according to claim 14 further comprising an annular baffle proximate said second vessel outlet and dividing said chamber, said annular baffle having perforations therein for removing wet desiccant from the dried gas molecules as the gas flows therethrough and having an open lower portion for passing wet liquid desiccant therethrough.

17. A method for dehydrating natural gas comprising the steps of:
   pumping liquid desiccant at a predetermined threshold level along a substantially linear path through a longitudinally horizontal pressure vessel; and
   feeding the gas from a pressurized source through the pressure vessel along a sinusoidal path having zeniths above the threshold level and nadirs below the threshold level to produce an output of dried gas and wet desiccant.

18. A method according to claim 17 further comprising the steps of:
   receiving the output of dried gas and wet desiccant in a second longitudinally horizontal pressure vessel containing the first; and
   gravity separating the wet desiccant and dried gas.

19. A method according to claim 18 further comprising the step of feeding the dried gas through a perforated baffle to assure that the wet desiccant has been substantially all removed from the dried gas.

20. A method according to claim 19 further comprising the step of pressure feeding the wet desiccant to a purification system.

* * * * *